(12) United States Patent
Matsuda

(10) Patent No.: US 12,174,932 B2
(45) Date of Patent: Dec. 24, 2024

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Munehisa Matsuda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 349 days.

(21) Appl. No.: 17/533,486

(22) Filed: Nov. 23, 2021

(65) Prior Publication Data

US 2022/0171838 A1 Jun. 2, 2022

(30) Foreign Application Priority Data

Nov. 27, 2020 (JP) ................................ 2020-197400

(51) Int. Cl.
*H04L 29/06* (2006.01)
*G06F 21/34* (2013.01)

(52) U.S. Cl.
CPC .................... *G06F 21/34* (2013.01)

(58) Field of Classification Search
CPC ....................................................... G06F 21/34
See application file for complete search history.

(56) References Cited

U.S. PATENT DOCUMENTS

| | | | |
|---|---|---|---|
| 2002/0026376 A1 | 2/2002 | Shioda et al. | |
| 2006/0005024 A1* | 1/2006 | Law | H04L 63/083 |
| | | | 713/168 |
| 2006/0089887 A1 | 4/2006 | Shioda et al. | |
| 2010/0208287 A1* | 8/2010 | Hanaoka | G06F 3/1285 |
| | | | 358/1.15 |
| 2016/0255664 A1 | 9/2016 | Li | |

(Continued)

FOREIGN PATENT DOCUMENTS

| | | |
|---|---|---|
| JP | 2002032692 A | 1/2002 |
| JP | 2005148952 A | 6/2005 |

(Continued)

OTHER PUBLICATIONS

Notice of Reasons for Refusal dated May 21, 2024 received in Japanese Patent Application No. JP 2020-197400.

*Primary Examiner* — Evans Desrosiers
(74) *Attorney, Agent, or Firm* — Scully, Scott, Murphy & Presser, P.C.

(57) ABSTRACT

A communication device may comprise: a controller; wherein the controller may be configured to: receive a first request from a first terminal device via a first-type communication path; in a case where the first request is received from the first terminal device, execute user authentication using a first authentication method; receive a second request from a second terminal device via a second-type communication path different from the first-type communication path; in a case where the second request is received from the second terminal device, execute the user authentication using a second authentication method different from the first authentication method; and in a case where the user authentication is successful, execute a predetermined process.

23 Claims, 9 Drawing Sheets

(56) References Cited

U.S. PATENT DOCUMENTS

| | | | |
|---|---|---|---|
| 2019/0197221 A1* | 6/2019 | Okada | H04L 9/3231 |
| 2019/0268336 A1* | 8/2019 | Gomi | H04W 12/069 |
| 2020/0228541 A1* | 7/2020 | Di Pietro | H04L 9/3234 |

FOREIGN PATENT DOCUMENTS

| | | | |
|---|---|---|---|
| JP | 2007072516 A | 3/2007 | |
| JP | 2010-198505 A | 9/2010 | |
| JP | 2014072770 A | 4/2014 | |
| JP | 2020035305 A | 3/2020 | |

\* cited by examiner

FIG. 8
(Case D: USB Login Process)
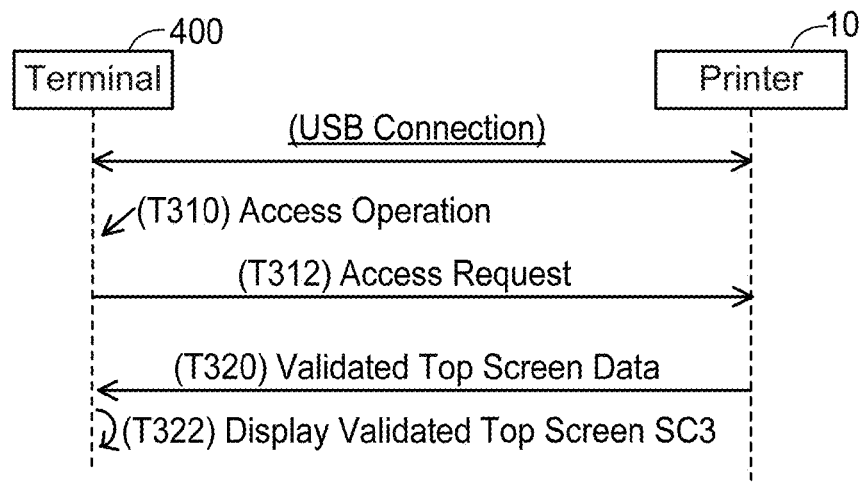
(Case E: WFD Login Process)
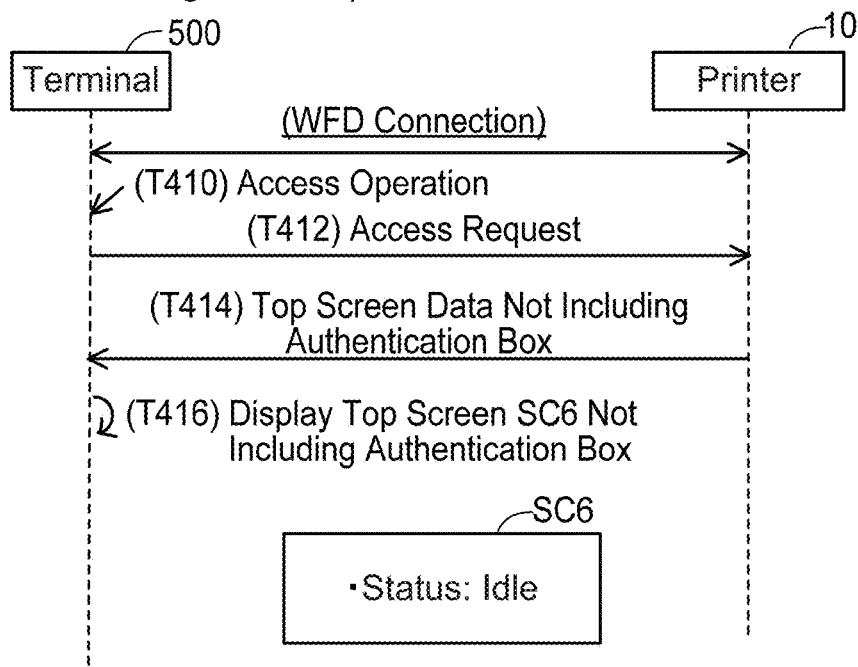

COMMUNICATION DEVICE AND NON-TRANSITORY COMPUTER-READABLE RECORDING MEDIUM STORING COMPUTER-READABLE INSTRUCTIONS FOR COMMUNICATION DEVICE

CROSS-REFERENCE TO RELATED APPLICATION

This application claims priority to Japanese Patent Application No. 2020-197400, filed on Nov. 27, 2020, the entire contents of which are incorporated herein by reference.

BACKGROUND

A technique for executing ID authentication in response to an ID being read from a contactless IC card is known.

SUMMARY

The disclosure herein discloses art that enables a communication device to operate suitably in accordance with communication path(s) used in receiving a request.

A communication device disclosed herein may comprise a controller. The controller may be configured to receive a first request from a first terminal device via a first-type communication path. The controller may, in a case where the first request is received from the first terminal device, execute user authentication using a first authentication method. The controller may receive a second request from a second terminal device via a second-type communication path different from the first-type communication path. The controller may, in a case where the second request is received from the second terminal device, execute the user authentication using a second authentication method different from the first authentication method. The controller may, in a case where the user authentication is successful, execute a predetermined process.

Another communication device disclosed herein may comprise a controller. The controller may be configured to receive a first request from a first terminal device via a first-type communication path. The controller may, in a case where the first request is received from the first terminal device, execute user authentication using a first authentication method. The controller may, in a case where the user authentication is successful, execute a predetermined process. The controller may receive a third request from a third terminal device via a third-type communication path. In a case where the third request is received from the third terminal device, the user authentication may not be executed.

Computer-readable instructions for the aforementioned communication device, a non-transitory computer-readable recording medium storing the computer-readable instructions, and a method executed by the communication device are also novel and useful.

BRIEF DESCRIPTION OF THE DRAWINGS

FIG. 8 shows a sequence diagram of a USB login process in Case D and a WFD login process in Case E.

DETAILED DESCRIPTION

Figure 1:
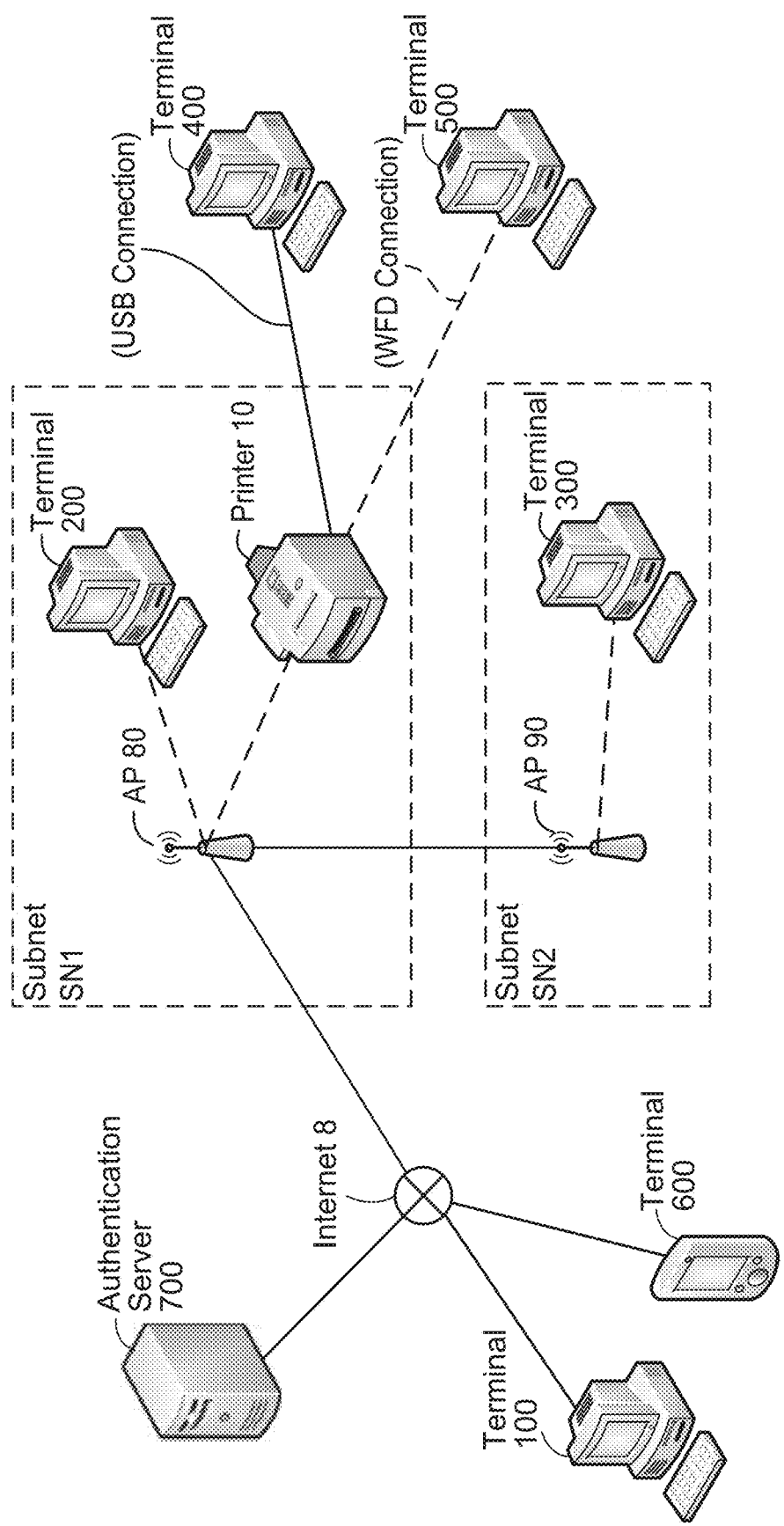
FIG. 1 shows a configuration of a communication system.

First Embodiment (Configuration of Communication System 2; FIG. 1)

As shown in FIG. 1, a communication system 2 comprises a printer 10, a plurality of access points 80, 90, a plurality of terminals 100 to 600, and an authentication server 700. Hereinbelow, an access point will simply be termed "AP". Each of the terminals 100 to 500 is a terminal device such as a stationary PC or a notebook PC. The terminal 600 is a portable terminal device such as a smartphone, a PDA, and a table PC.

The printer 10 and each of the terminals 200, 300 are connected to a Local Area Network (LAN), and are configured to communicate with each other via the LAN. Especially, the printer 10 and the terminal 200 belong to a subnet SN1 established by the AP 80. The terminal 300 belongs to a subnet SN2 established by the AP 90. The AP 80 and the AP 90 are connected to each other by a cable.

The AP 80 is connected to the Internet 8. Further, the authentication server 700 and each of the terminals 100, 600 are connected to the Internet 8. As such, each of the devices 10, 100 to 300, 600, 700 is configured to communicate with each other via the Internet 8. The authentication server 700 is provided on the Internet 8 by a vendor of the printer 10, for example. The authentication server 700 is a server configured to execute generation and authentication of a Personal Identification Number (PIN) code.

The printer 10 and the terminal 400 are configured to communicate with each other via a Universal Serial Bus (USB) cable. A wireless connection according to a Wi-Fi Direct (registered trademark) scheme is established between the printer 10 and the terminal 500, and thus the printer 10 and the terminal 500 are configured to communicate with each other via this wireless connection. Hereinbelow, Wi-Fi Direct will be termed "WFD", and a wireless connection according to the WFD scheme will be termed "WFD connection".

Figure 2:
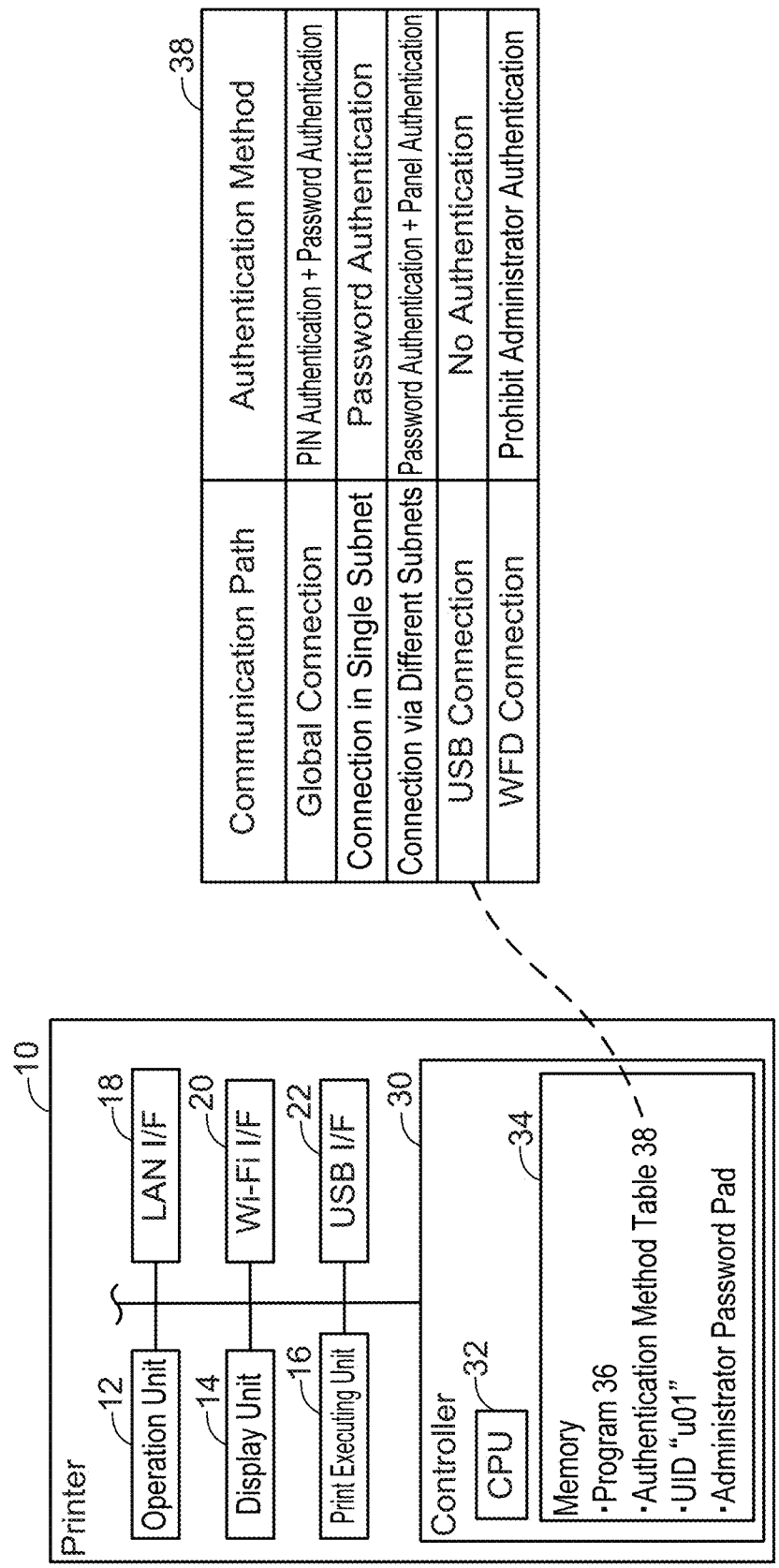
FIG. 2 shows a block diagram of a configuration of a printer.

(Configuration of Printer 10; FIG. 2)

The printer 10 is a peripheral device (e.g., a peripheral device of the terminal 100) configured to execute a print function. In a variant, the printer 10 may be a multi-function device configured to execute a scan function, a FAX function and the like in addition to the print function. The printer 10 may also function as a web server. The printer 10 comprises an operation unit 12, a display unit 14, a print execution unit 16, a LAN interface 18, a Wi-Fi interface 20, a USB interface 22, and a controller 30. The respective units 12 to 30 are connected to a bus line (reference sign omitted). Hereinbelow, an interface will be termed "I/F".

The operation unit 12 includes a plurality of keys. A user can input various instructions to the printer 10 by operating the operation unit 12. The display unit 14 is a display for displaying various types of information. The display unit 14 functions also as a touch screen (i.e., operation unit) for accepting instructions from the user. The print execution unit 16 comprises a print mechanism of an inkjet scheme, a laser scheme, or the like.

The LAN I/F 18 has an established wireless connection with the AP 80. In a variant, the LAN I/F 18 may be a wired I/F. The Wi-Fi I/F 20 is a wireless I/F for establishing a WFD connection. The present embodiment contemplates that the LAN I/F 18 and the Wi-Fi I/F 20 are each a chip different from each other, however, the I/F for establishing a wireless connection with an AP and the I/F for establishing a WFD connection may be integrated in one chip. In this case, a MAC address used in the former I/F and a MAC address used in the latter I/F are different, the printer 10 can thus identify which one of the I/Fs was used to receive a request based on a MAC address included in this request. One end of the USB cable is connected to the USB I/F 22.

The controller 30 comprises a CPU 32 and a memory 34. The CPU 32 is configured to execute various processes according to a program 36 stored in the memory 34. The memory 34 is configured of a volatile memory, a nonvolatile memory, and the like. The memory 34 stores an authentication method table 38, a UID "u01", and an administrator password Pad. The UID "u01" is information that identifies the printer 10 (e.g., a serial number). The administrator password Pad is a password used to log in to the web server in the printer 10.

The authentication method table 38 stores a communication path and an authentication method in association with each other. The communication path refers to a communication path used to receive an access request for accessing the web server in the printer 10. The authentication method refers to a method of authentication executed upon logging in to the web server in the printer 10. For example, in an example of FIG. 2, both PIN authentication and password authentication are associated with "global connection" which means a connection via the Internet 8. This means that when the printer 10 receives the access request via the Internet 8, both the PIN authentication and the password authentication are executed.

Figure 3:
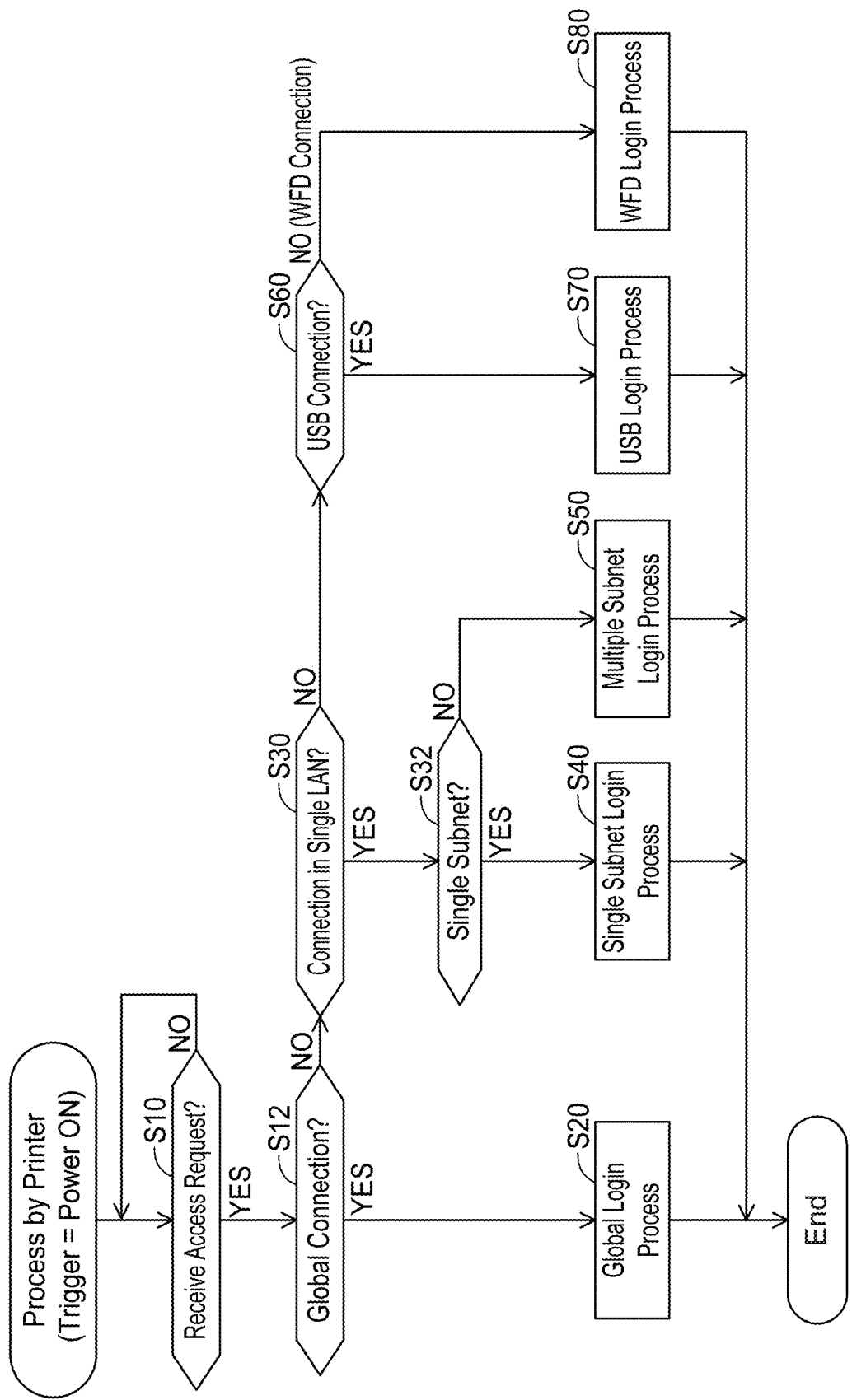
FIG. 3 shows a flowchart of a process executed by the printer.

(Process by Printer; FIG. 3)

A process which the CPU 32 of the printer 10 executes will be described with reference to FIG. 3. The CPU 32 starts the process of FIG. 3 when power of the printer 10 is turned on.

In S10, the CPU 32 monitors receipt of an access request from one of the terminals (e.g., terminal 100). Hereinbelow, a terminal being a sender of the access request will be termed "target terminal". In the case where the CPU 32 receives the access request from the target terminal, it determines YES in S10 and proceeds to S12.

In S12, the CPU 32 determines whether or not the access request was received via the global connection (i.e., via the Internet 8). Specifically, in the case where the access request was received via the LAN I/F 18 and the access request includes a global IP address of the target terminal, the CPU 32 determines YES in S12 and proceeds to S20. On the other hand, in the case where the CPU 32 determines that the access request was not received via the LAN I/F 18 or in the case where the access request was received via the LAN I/F 18 but does not include any global IP address, the CPU 32 determines NO in S12 and proceeds to S30.

In S20, the CPU 32 executes a global login process. The global login process will be described later with reference to FIGS. 4 and 5. When the process of S20 is completed, the process of FIG. 3 is terminated.

In S30, the CPU 32 determines whether or not the access request is an access request received from a device in the LAN (i.e., subnets SN1 and SN2). Specifically, in the case where the access request was received via the LAN I/F 18 and does not include any global IP address (i.e., including only a private IP address (i.e., local IP address) of the target terminal), the CPU 32 determines YES in S30 and proceeds to S32. On the other hand, in the case where the access request was not received via the LAN I/F 18, the CPU 32 determines NO in S30 and proceeds to S60.

In S32, the CPU 32 determines whether or not the access request was received from a device in the subnet to which the printer 10 belongs. Specifically, the CPU 32 determines whether or not a network address, which is obtained from the private IP address of the target terminal included in the access request and a subnet mask of the printer 10 stored in the memory 34 of the printer 10, matches a network address, which is obtained from a private IP address of the printer 10 and the aforementioned subnet mask. The CPU 32 determines YES in S32 and proceeds to S40 in the case where these network addresses match, while determines NO in S32 and proceeds to S50 in the case where these network addresses are different.

In S40, the CPU 32 executes a single subnet login process. The single subnet login process will be described later with reference to FIG. 6. When the process of S40 is completed, the process of FIG. 3 is terminated.

In S50, the CPU 32 executes a multiple subnet login process. The multiple subnet login process will be described later with reference to FIG. 7. When the process of S50 is completed, the process of FIG. 3 is terminated.

In S60, the CPU 32 determines whether or not the access request was received via the USB I/F 22. In the case where the access request was received via the USB I/F 22, the CPU 32 determines YES in S60 and proceeds to S70. On the other hand, in the case where the access request was not received via the USB I/F 22, that is, in the case where the access request was received via the Wi-Fi I/F 20, the CPU 32 determines NO in S60 and proceeds to S80.

In S70, the CPU 32 executes a USB login process. The USB login process will be described later with reference to FIG. 8. When the process of S70 is completed, the process of FIG. 3 is terminated.

In S80, the CPU 32 executes a WFD login process. The WFD login process will be described later with reference to FIG. 8. When the process of S80 is completed, the process of FIG. 3 is terminated.

Figure 4:
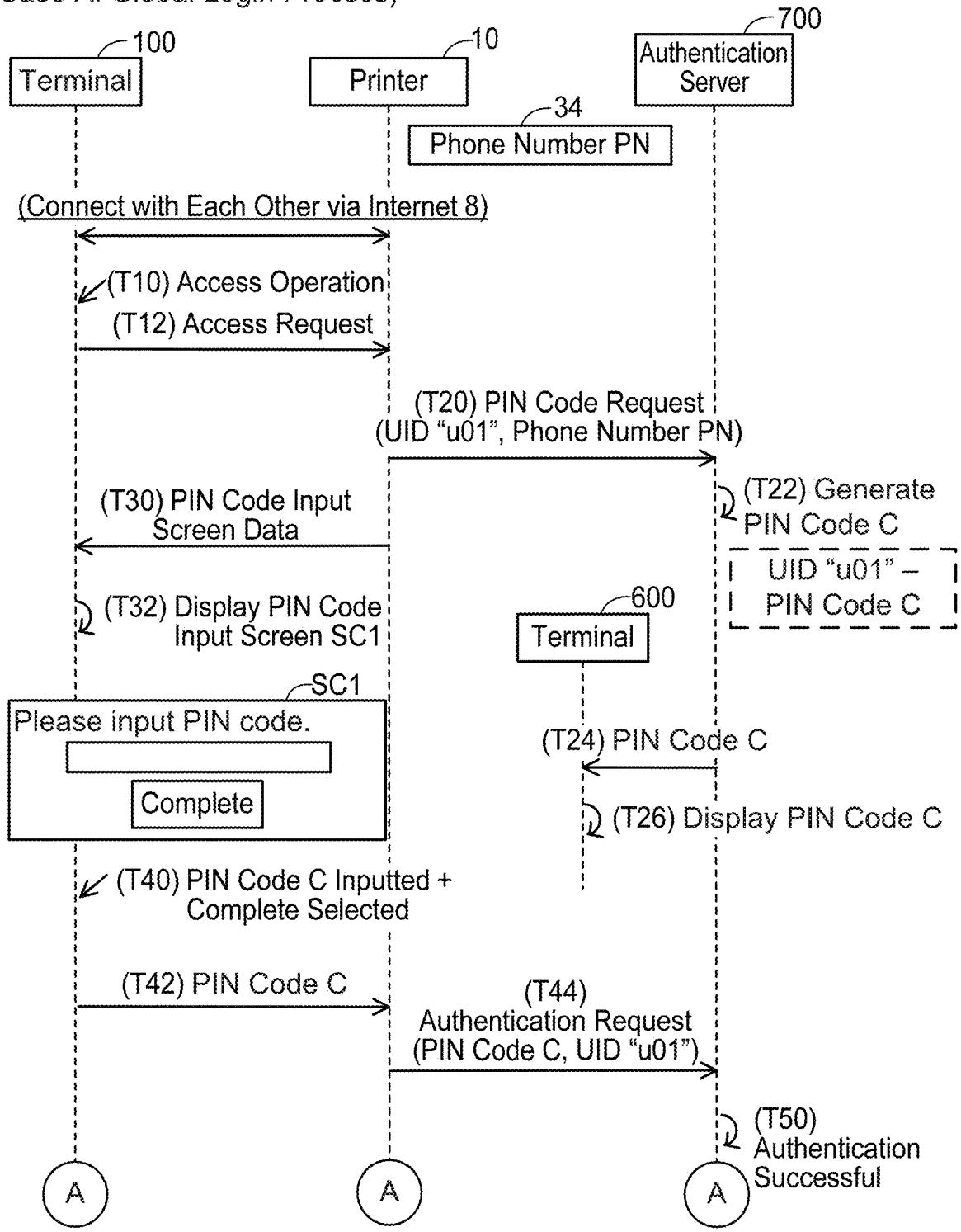
FIG. 4 shows a sequence diagram of a global login process in Case A.
Figure 5:
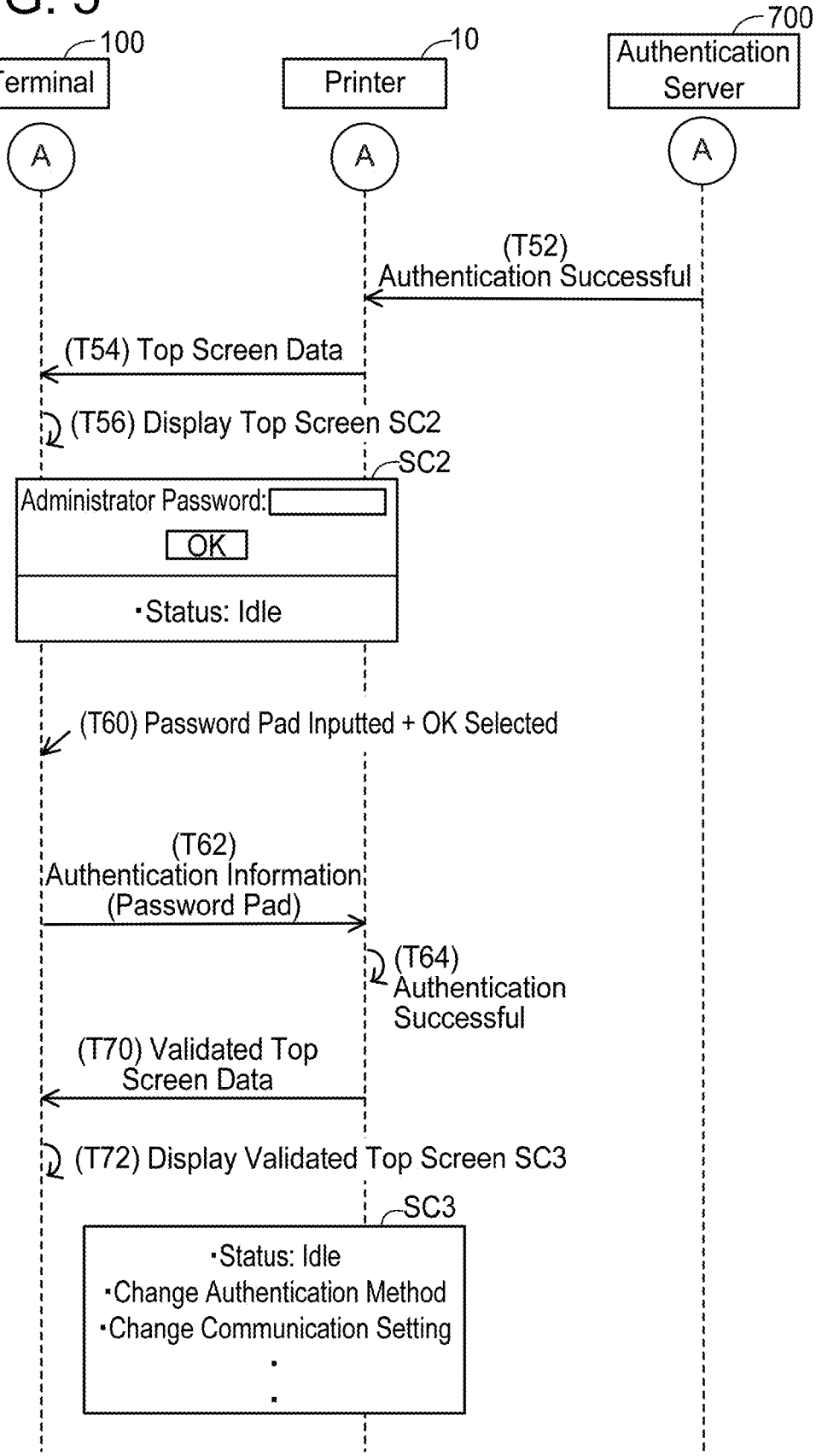
FIG. 5 shows a sequence diagram continued from FIG. 4.

(Case A: Global Login Process (S20 in FIG. 3); FIGS. 4 and 5)

Next, specific Cases A to E implemented by the process of FIG. 3 will be described. Firstly, Case A in which the global login process is executed will be described with reference to FIGS. 4 and 5. Hereinbelow, for the sake of easier understanding, operations executed by a CPU of each device (e.g., CPU 32) may be described with each device (e.g., printer 10) as a subject of the operations instead describing the CPU as the subject of the operations.

Prior to the process of FIG. 4, a process to cause the printer 10 to store a phone number PN of the terminal 600 which an administrator of the printer 10 uses is executed. The administrator of the printer 10 causes the printer 10 to store the phone number PN of the terminal 600 by for example operating the operation unit 12 of the printer 10. As a result, in the initial state of FIG. 4, the memory 34 of the printer 10 stores the phone number PN. In a variant, the printer 10 may store the phone number PN of the terminal 600 when the web server of the printer 10 is accessed from the terminal 600 and the phone number PN is inputted thereto. Although details will be described later, the phone number PN is used as a recipient of a PIN code. The terminal 100 and the printer 10 are connected to each other via the Internet 8 (see FIG. 1).

In T10 of FIG. 4, the terminal 100 obtains an access instruction for accessing the web server of the printer 10 from the user. In this case, the terminal 100 sends an access request to the printer 10 in T12. This access request includes a global IP address of the terminal 100.

When the access request is received from the terminal 100 via the Internet 8 and the LAN I/F 18 in T12 (YES in S10 in FIG. 3), since this access request includes the global IP address of the terminal 100, the printer 10 determines that this access request was received via the Internet 8 (YES in S12). In this case, based on the authentication method table 38 (see FIG. 2), the printer 10 determines that the PIN authentication and the password authentication that are associated with the global connection are to be executed.

Next, in T20, the printer 10 sends a PIN code request to the authentication server 700. The PIN code request includes the UID "u01" of the printer 10 and the phone number PN. The PIN code request is a request for instructing the authentication server 700 to send a PIN code with the phone number PN included in this request as the recipient.

When the PIN code request is received from the printer 10 in T20, the authentication server 700 generates a PIN code C in T22. In this case, the authentication server 700 stores the UID "u01" included in the PIN code request and the generated PIN code C in association with each other. In T24, the authentication server 700 sends the PIN code C with the phone number PN included in the PIN code request as the recipient.

When the PIN code C is received from the authentication server 700 in T24, the terminal 600 displays the PIN code C in T26. Due to this, the administrator can acknowledge the PIN code C.

Further, in T30, the printer 10 sends a PIN code input screen data to the terminal 100 via the Internet 8 and the LAN I/F 18.

When the PIN code input screen data is received from the printer 10 in T30, the terminal 100 displays a PIN code input screen SC1 in T32. The PIN code input screen SC1 includes a message prompting to input a PIN code, a PIN code input box, and a completion button.

When an input of the PIN code C displayed in T26 and a selection of the completion button by the administrator are accepted in T40, the terminal 100 sends the PIN code C to the printer 10 in T42.

When the PIN code C is received from the terminal 100 via the Internet 8 and the LAN I/F 18 in T42, the printer 10 sends an authentication request to the authentication server 700 in T44. The authentication request includes the PIN code C received in T42 and the UID "u01" of the printer 10.

When the authentication request is received from the printer 10 in T44, the authentication server 700 executes authentication of the PIN code C. In the present case, since the PIN code C and the UID "u01" included in the authentication request are stored in association with each other in the authentication server 700 (see T22), the authentication server 700 determines that the authentication of the PIN code C was successful in T50.

(Continuation of FIG. 4; FIG. 5)

In response to the authentication of the PIN code C having been successful in T50 of FIG. 4, the authentication server 700 sends, to the printer 10, a notification in T52 of FIG. 5 indicating that the authentication of the PIN code C was successful. The process from T52 is not executed when the authentication of the PIN code C fails.

When the notification is received from the authentication server 700 in T52, the printer 10 sends a top screen data representing a top screen SC2 to the terminal 100 in T54.

When the top screen data is received from the printer 10 in T54, the terminal 100 displays the top screen SC2 in T56. The top screen SC2 includes an administrator password input box, an OK button, and a status of the printer 10 (e.g., Idle).

In T60, when a selection of the OK button is accepted after an input of the administrator password Pad by the user is accepted, the terminal 100 sends authentication information to the printer 10 in T62. The authentication information includes the inputted administrator password Pad.

When the authentication information is received via the Internet 8 and the LAN I/F 18 in T62, the printer 10 executes authentication of this authentication information. In the present case, since the administrator password Pad included in the received authentication information and the administrator password Pad stored in the memory 34 match, the printer 10 determines in T64 that the authentication was successful. In this case, the printer 10 sends validated top screen data representing a validated top screen SC3 to the terminal 100 via the Internet 8 and the LAN I/F 18 in T70. The process from T70 is not executed when the authentication of the administrator password Pad fails.

When the validated top screen data is received from the printer 10 in T70, the terminal 100 displays the validated top screen SC3 in T72. The validated top screen SC3 may for example include the status of the printer 10 (e.g., Idle) and buttons for changing settings of the printer 10. Due to this, the administrator can change the settings of the printer 10 by using the validated top screen SC3. As above, in the global login process, the validated top screen SC3 is provided to the administrator on condition that a so-called two-phase authentication, namely the PIN authentication and the password authentication, is successful.

Figure 6:
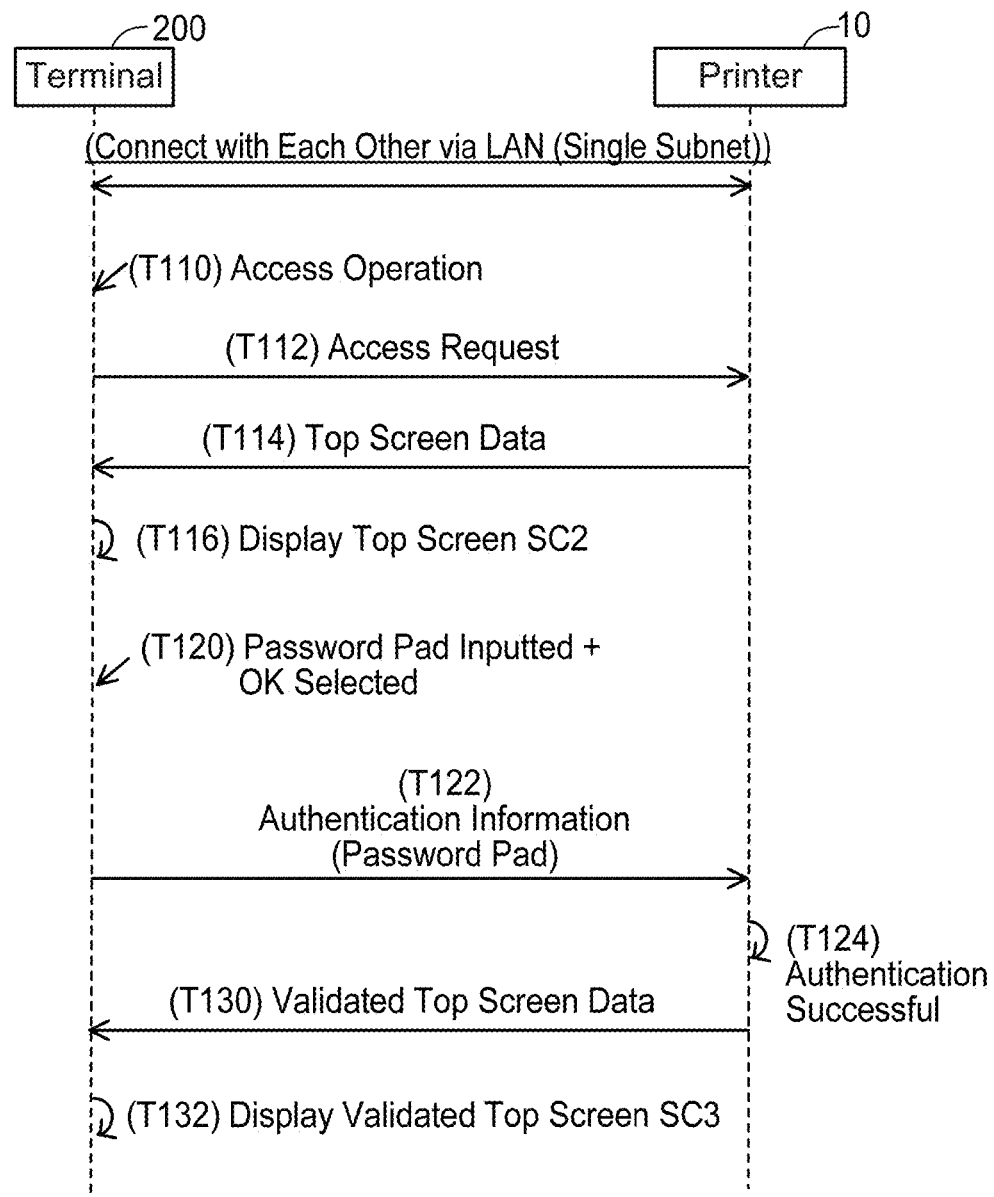
FIG. 6 shows a sequence diagram of a single subnet login process in Case B.

(Case B: Single Subnet Login Process (S40 in FIG. 3); FIG. 6)

Next, Case B in which the single subnet login process is executed will be described with reference to FIG. 6. The terminal 200 and the printer 10 belong to the same subnet SN1 (see FIG. 1).

In T110 of FIG. 6, the terminal 200 obtains an access instruction for accessing the web server of the printer 10 from the user. In this case, the terminal 200 sends an access request to the printer 10 in T112.

When the access request is received from the terminal 200 via the LAN I/F 18 in T112 (YES in S10 of FIG. 3), since this access request does not include the global IP address, the printer 10 determines that this access request is not received via the Internet 8 (NO in S12). Further, the printer 10 determines that this access request was received via the LAN I/F 18 (YES in S30), and further determines that the printer 10 and the terminal 200 belong to the same subnet SN1 (YES in S32). In this case, the printer 10 determines that the password authentication associated with a single subnet connection is to be executed based on the authentication method table 38 (see FIG. 2).

Next, in T114, the printer 10 sends the top screen data to the terminal 200 via the LAN I/F 18. The subsequent processes of T116 to T132 are same as the processes of T56 to T72 in FIG. 5. As above, in the single subnet login process, the validated top screen SC3 is provided to the administrator on condition that only the password authentication is successful.

Figure 7:
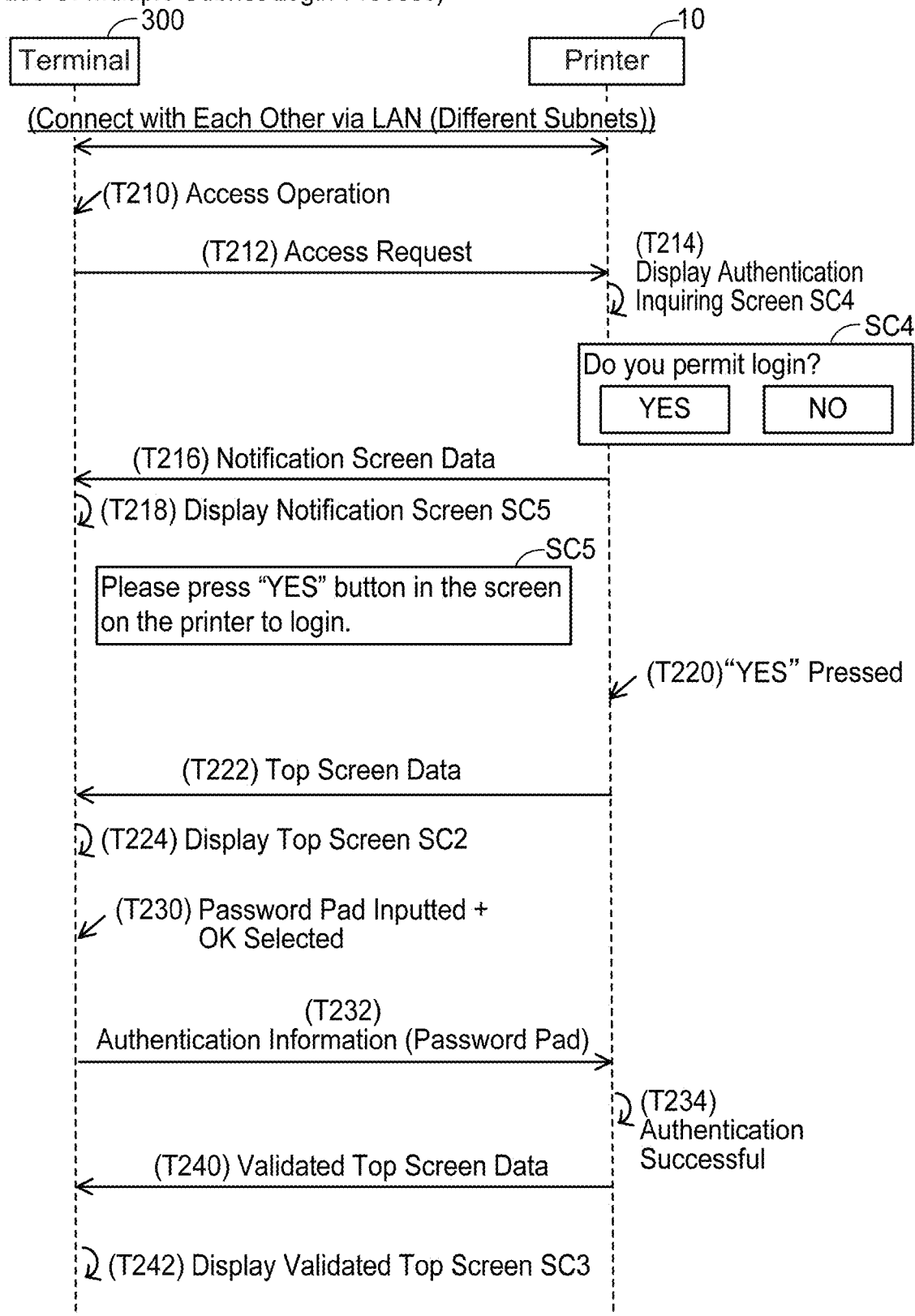
FIG. 7 shows a sequence diagram of a multiple subnet login process in Case C.

(Case C: Multiple Subnet Login Process (S50 in FIG. 3); FIG. 7)

Next, Case C in which the multiple subnet login process is executed will be described with reference to FIG. 7. The terminal 300 and the printer 10 belong to different subnets (see FIG. 1).

In T210 of FIG. 7, the terminal 300 obtains an access instruction for accessing the web server of the printer 10 from the user. In this case, the terminal 300 sends an access request to the printer 10 in T212.

When the access request is received from the terminal 300 via the LAN I/F 18 in T212 (YES in S10 of FIG. 3), since this access request does not include any global IP address, the printer 10 determines that this access request was not received via the Internet 8 (NO in S12). Further, the printer 10 determines that this access request was received via the LAN I/F 18 (YES in S30), and further determines that the printer 10 and the terminal 300 belong to different subnets (NO in S32). In this case, the printer 10 determines based on the authentication method table 38 (see FIG. 2) that the password authentication and panel authentication associated with a connection via different subnets are to be executed.

Next, in T214, the printer 10 displays an authentication inquiring screen SC4 on the display unit 14. The authentication inquiring screen SC4 includes a message for inquiring the user whether login is to be authorized, a YES button, and a NO button. That is, the authentication inquiring screen SC4 is a screen for executing the panel authentication. Further, in T216, the printer 10 sends notification screen data representing a notification screen SC5 to the terminal 300 via the LAN I/F 18.

When the notification screen data is received from the printer 10 in T216, the terminal 300 displays the notification screen SC5 in T218. The notification screen SC5 includes a message indicating that the YES button in the authentication inquiring screen SC4 should be selected to log in to the web server of the printer 10. Due to this, the administrator can acknowledge that the YES button in the authentication inquiring screen SC4 should be selected.

When selection of the YES button in the authentication inquiring screen SC4 by the administrator is accepted in T220, the printer 10 sends top screen data to the terminal 200 via the LAN I/F 18 in T222. Processes from T222 are not executed when the NO button in the authentication inquiring screen SC4 is selected. Processes from T224 to T242 are the same as the processes of T56 to T72 in FIG. 5. As above, in the multiple subnet login process, the validated top screen SC3 is provided to the administrator on condition that a so-called two-phase authentication, namely the password authentication and the panel authentication, is successful.

(Case D: USB Login Process (S70 of FIG. 3); FIG. 8)

Next, Case D in which the USB login process is executed will be described with reference to FIG. 8. The terminal 400 and the printer 10 are connected to each other by the USB cable (see FIG. 1).

In T310 of FIG. 8, the terminal 400 obtains an access instruction from the user for accessing the web server of the printer 10. In this case, the terminal 400 sends an access request to the printer 10 in T312.

When the access request is received from the terminal 400 via the USB I/F 22 in T312 (YES in S10 of FIG. 3), the printer 10 determines that the access request was received via the USB I/F 22 (NO in S12, NO in S30, YES in S60). In this case, the printer 10 determines that an authentication is not executed according to the authentication method table 38 (see FIG. 2).

Next, in T320, the printer 10 sends the validated top screen data to the terminal 400 via the USB I/F 22. A process of T322 is the same as the process of T72 of FIG. 5. As above, in the USB login process, the validated top screen SC3 is provided to the administrator without execution of any authentication.

(Case E: WFD Login Process (S80 of FIG. 3); FIG. 8)

Next, Case E in which the WFD login process is executed will be described with reference to FIG. 8. The terminal 500 and the printer 10 are connected to each other by a WFD connection (see FIG. 1).

In T410 of FIG. 8, the terminal 500 obtains an access instruction from the user for accessing the web server of the printer 10. In this case, the terminal 500 sends an access request to the printer 10 in T412.

When the access request is received from the terminal 500 via the Wi-Fi I/F 20 in T412 (YES in S10 of FIG. 3), since this access request does not include any global IP address, the printer 10 determines that the access request was not received via the Internet 8 (NO in S12). Further, since this access request is received via the Wi-Fi 20, the printer 10 determines that the access request was not received via the LAN I/F 18 (NO in S30), and determines that the access request was received via the Wi-Fi I/F 20 (i.e., WFD connection) (NO in S60). In this case, the printer 10 determines that administrator authentication is to be prohibited according to the authentication method table 38 (see FIG. 2).

Then, in T414, the printer 10 sends top screen data representing a top screen SC6 not including an authentication box to the terminal 500 via the Wi-Fi I/F 20.

When the top screen data is received from the printer 10 in T414, the terminal 500 displays the top screen SC6 not including the authentication box in T416. The top screen SC6 does not include the administrator password input box but includes the status of the printer 10 (e.g., Idle). As above, since the top screen SC6 does not include the administrator password input box, the administrator authentication is prohibited. As a result, the validated top screen SC3 is not provided to the user of the terminal 500.

Effect of Present Embodiment

As aforementioned, in the case where the printer 10 receives the access request via the Internet 8 (YES in S10 and YES in S12 of FIG. 3, T12 of FIG. 4), the printer 10 executes the user authentication by executing both the authentication of the PIN code C (T52 of FIG. 5) and the authentication of the administrator password Pad (T64). Further, in the case where the printer 10 receives the access request via the communication path within the single subnet SN1 (YES in S10, NO in S12, YES in S30, YES in S32 of FIG. 3, T112 of FIG. 6), the printer 10 executes the user authentication by executing only the authentication of the administrator password Pad (T124). Further, in the case where the printer 10 receives the access request via the communication path via the plurality of subnets SN1, SN2 (YES in S10, NO in S12, YES in S30, NO in S32 of FIG. 3, T212 of FIG. 7), the printer 10 executes the user authentication by executing both the panel authentication (T220 of FIG. 7) and the authentication of the administrator password Pad (T234). Due to this, the printer 10 can execute the user authentication using authentication methods according to types of the communication paths (i.e., global connection, single subnet connection, and multiple subnet connection). As above, according to the present embodiment, the printer 10 can suitably operate according to the types of the communication paths used in receiving the access request.

Especially in the case where the printer 10 receives the access request via the Internet 8, it is preferable to increase security of the user authentication as compared to the case where the access request is received without intervention of the Internet 8. This is because the access request via the Internet 8 may be sent by a third party intending to attack the printer 10. As such, in the present embodiment, the printer 10 executes the authentication of the PIN code C (T52 of FIG. 5) in the case where the printer 10 receives the access request via the Internet 8 (T12 of FIG. 4). The authentication of the PIN code C includes a plurality of processes such as prior registration of the phone number PN, receipt of the PIN code C by the terminal 600 (T24 to 26 of FIG. 4), input of this PIN code C (T40), and the like. Due to this, the authentication of the PIN code C is more secure compared to the mere authentication of the administrator password Pad used in the single subnet connection. Further, the authentication of the PIN code C is also more secure compared to the combination of the authentication of the administrator password Pad and the panel authentication used in the multiple subnet connection. Further, the PIN code C is generated in the authentication server 700 after the printer 10 receives the access request from the terminal 100. That is, the PIN code C is not information that is stored in advance in the printer 10. This also contributes to increasing the security. In addition, in the case where the printer 10 receives the access request via the Internet 8, the printer 10 executes not only the authentication of the PIN code C but also the authentication of the administrator password Pad (T64 of FIG. 5). This can ensure higher security.

Further, in the case where the printer 10 receives the access request from the terminal 200 via the communication path within the single subnet SN1 (T112 of FIG. 6), the printer 10 executes only the authentication of the administrator password Pad (T124 of FIG. 6). When the communication path within the single subnet SN1 is used, it is highly likely that the terminal 200 and the printer 10 are set up in proximity to each other. As such, it is highly unlikely that this access request is sent by a third party. Due to this, it is also possible to ensure high security only by the authentication of the administrator password Pad. Since the administrator needs to perform relatively less operations, convenience for the administrator is improved.

Further, in the case where the printer 10 receives the access request from the terminal 300 via the communication path including the plurality of subnets SN1, SN2 (T212 of FIG. 7), the printer 10 executes the panel authentication and the password authentication (T214, T220, and T234 of FIG. 7). In the case in which the communication path in the plurality of subnets SN1, SN2 is used, it is more likely that the access request is sent by a third party who is not the administrator as compared to the case where the communication path within the single subnet SN1 is used. Due to this, in order to ensure higher security than the case where the communication path within the single subnet SN1 is used, the printer 10 executes not only the password authentication but also the panel authentication. In this case, since the administrator needs to approach the printer 10 and select the YES button in the authentication authorizing screen SC4, the security can be increased. However, as aforementioned, the password authentication and the panel authentication require the administrator to perform less operations as compared to the authentication of the PIN code C. Due to this, the convenience for the administrator is improved.

Further, in the case where the printer 10 receives the access request via the communication path using the USB cable (YES in S10, NO in S12, NO in S30, YES in S60 of FIG. 3, T312 of FIG. 8), the printer 10 does not execute the user authentication (T320). Further, the printer 10 does not execute the user authentication (T414) also in the case where the printer 10 receives the access request via the communication path using the WFD connection (YES in S10, NO in S12, NO in S30, NO in S60 of FIG. 3, T412 of FIG. 8). As above, the printer 10 does not execute the user authentication in the cases where execution of the user authentication is not necessary. Due to this, processing load of the printer 10 can be reduced.

Especially in the case where the printer 10 receives the access request from the terminal 400 via the communication path using the USB cable (T312 of FIG. 8), it is highly likely that the terminal 400 and the printer 10 are in proximity to each other. As such, it is highly unlikely that this access request is sent by a third party. Due to this, the printer 10 sends the validated top screen data to the terminal 400 without executing the user authentication (T320 of FIG. 8). As such, since the administrator does not have to perform input of the administrator password Pad and the like, the convenience for the administrator is improved.

Further, in the case where the printer 10 receives the access request from the terminal 500 via the communication path using the WFD connection (T412 of FIG. 8), it is likely that the user of the terminal 500 is a user who is using the printer 10 temporarily. That is, it is likely that the user of the terminal 500 is not the administrator of the printer 10. Due to this, in the case where the printer 10 receives the access request via the communication path using the WFD connection, the printer 10 sends, to the terminal 500, the top screen SC6 not including the authentication box (T414 of FIG. 8). That is, the user of the terminal 500 is prohibited from accessing the validated top screen SC3. Due to this, the security of the printer 10 can be increased.

(Corresponding Relationship)

The printer 10 and the authentication server 700 are respectively an example of "communication device" and "authentication server". The terminal 100 is an example of "first terminal device". The terminals 200 and 300 are examples of "second terminal device". The terminals 400 and 500 are examples of "third terminal device". The communication path via the Internet 8 is an example of "first-type communication path". The communication path within the single subnet SN1 and the communication path via different subnets SN1 and SN2 are examples of "second-type communication path". The communication path using the USB cable and the communication path using the WFD connection are examples of "third-type communication path". The WFD connection is an example of "wireless connection without intervention of any other devices".

The access request in T12 of FIG. 4, the access request in T112 of FIG. 6 (and the access request in T212 of FIG. 7), and the access request in T312 of FIG. 8 (and the access request in T412) are respectively examples of "first request", "second request", and "third request". The administrator password Pad and the PIN code C are respectively an example of "first authentication information" and "second authentication information". The combination of the authentication of the PIN code C and the authentication of the administrator password Pad is an example of "first authentication method". In one example, the authentication of the administrator password Pad is an example of "second authentication method". In another example, the combination of the authentication of the administrator password Pad and the panel authentication is an example of the "second authentication method". The authentication of the PIN code C, the authentication of the administrator password Pad, and the panel authentication are respectively an example of "first user authentication", "second user authentication", and "third user authentication". The selection of the YES button in T220 of FIG. 7 is an example of "predetermined operation". The transmission of the validated top screen data and the transmission of the top screen data not including the authentication box are respectively an example of "predetermined process" and "process different from the predetermined process".

Figure 9:
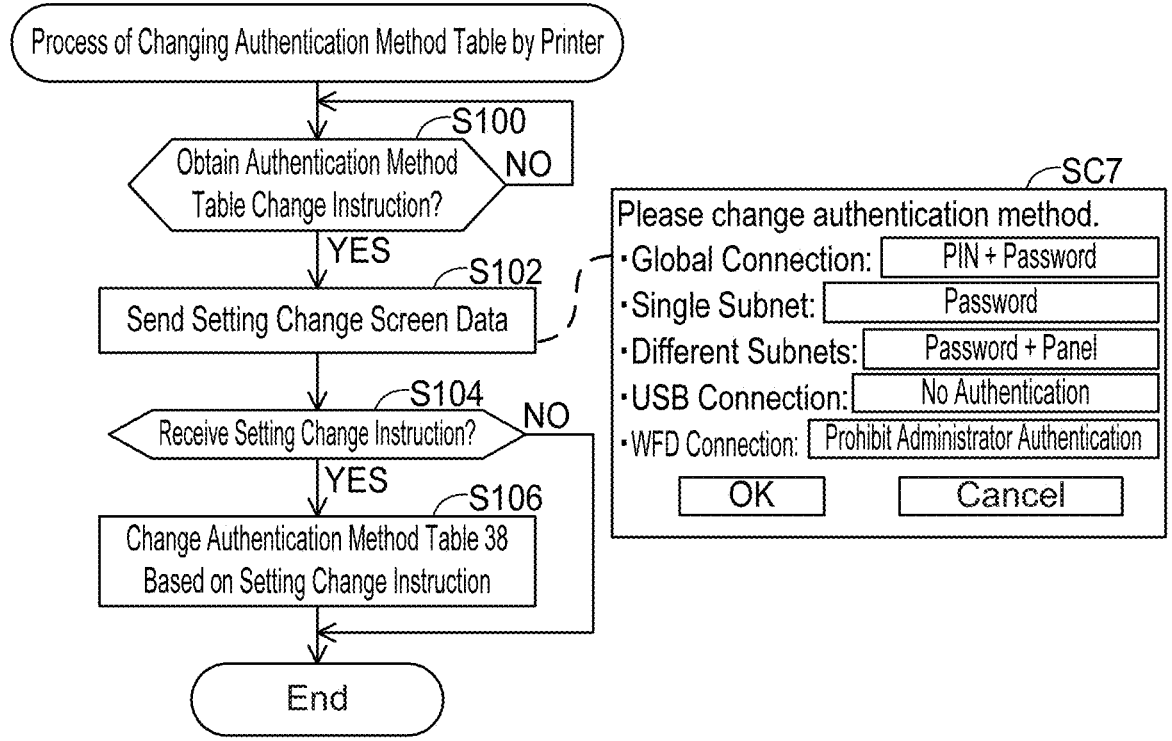
FIG. 9 shows a flowchart of an authentication method table changing process by the printer and an authentication method table before and after a change.

The process of S10 of FIG. 3 (and the process of T12 of FIG. 4) are examples of "receive a first request". The processes of T52 and T64 of FIG. 5 are examples of "execute user authentication using a first authentication method". The process of S10 (and the processes of T112 of FIGS. 6 and T212 of FIG. 7) are examples of "receive a second request". The process of T124 of FIG. 6 (and the processes of T220, T234 of FIG. 7) are examples of "execute user authentication using a second authentication method". The process of S10 (and the processes of T312, T412 of FIG. 8) are examples of "receive a third request". The process of T70 of FIG. 5 (and the processes of T130 of FIG. 6, T240 of FIG. 7, and T320 of FIG. 8) are examples of "execute a predetermined process" and the process of T414 of FIG. 9 is an example of "execute a process different from the predetermined process".

Second Embodiment

A second embodiment will be described. The second embodiment is different from the first embodiment in that the user can change the authentication method table 38 (see FIG. 2).
(Authentication Method Table Changing Process; FIG. 9)

An authentication table changing process which the CPU 32 of the printer 10 executes will be described with reference to FIG. 9. In S100 of FIG. 9, the CPU 32 monitors obtaining a change instruction for changing the authentication method table 38 from the administrator. Specifically, the printer 10 determines that the change instruction is obtained in the case where the printer 10 receives, from a terminal (e.g., terminal 100), information indicating a button "change authentication method" in the validated top screen SC3 (see FIG. 5) is selected (YES in S100). Hereinbelow, the terminal that sent this information will also be termed "target terminal".

In S102, the CPU 32 sends setting change screen data representing a setting change screen SC7 to the target terminal. As a result, the setting change screen SC7 is displayed on the target terminal. The setting change screen SC7 includes current setting values in the authentication method table 38 (i.e., authentication methods corresponding to the respective communication paths), an OK button, and a cancel button. The user of the target terminal (i.e., administrator) is allowed to change the authentication method corresponding to each of the communication paths in the setting change screen SC7.

In S104, the CPU 32 determines whether a setting change instruction has been received. Specifically, when the OK button in the setting change screen SC7 displayed on the target terminal is selected, the printer 10 receives the setting change instruction from the target terminal. The setting change instruction includes the respective setting values described in the setting change screen SC7 when the OK button is selected. The CPU 32 determines YES in S104 and proceeds to S106 in the case where the CPU 32 receives the setting change instruction from the target terminal. On the other hand, in the case where the CPU 32 receives a cancelling instruction from the target terminal due to the cancel button in the setting change screen SC7 being selected, the CPU 32 determines NO in S104 and terminates the process of FIG. 9 without executing the process of S106.

In S106, the CPU 32 changes the authentication method table 38 according to the setting change instruction received in S104. For example, as described in a lower portion of FIG. 9, when the setting change instruction indicates "panel authentication" as the authentication method corresponding to "single subnet connection", the CPU 32 changes the authentication method corresponding to the "single subnet connection" from "password authentication" to "panel authentication". When the process of S106 is completed, the process of FIG. 9 is terminated.

When the same processes as T110 to T112 of FIG. 6 are executed after the authentication method table 38 has been changed as in the above example, the panel authentication (i.e., displaying the authentication authorizing screen SC4) is executed instead of the password authentication (see T214 of FIG. 7). As above, the administrator can set an authentication method which the administrator desires in the printer 10. Due to this, the convenience for the administrator is improved. In the present embodiment, the panel authentication is an example of "third authentication method".

(Variant 1) The printer 10 may execute processes that are the same as FIGS. 4 and 5 in the case where the printer 10 receives a print request from a terminal (e.g., 100). In this case, the printer 10 may execute a printing process according to the print request in the case where both the authentication of the PIN code C and the authentication of the administrator password Pad are successful. In this variant, the printing process is an example of the "predetermined process". In general terms, the "predetermined process" may be any process executed in response to the user authentication being successful, and thus may be a process of providing screen data as in the above embodiments, may be image processing as in this variant, or may be another process such as an information registration process, some sort of computation process, and a process to permit usage of a database.

(Variant 2) The printer 10 may execute for example the authentication of the administrator password Pad (see T114 to T124 of FIG. 6) in the case where the printer 10 receives the access request from the terminal 400 via the communication path using the USB cable (T312 of FIG. 8). In this variant, the communication path using the USB cable is an example of the "second-type communication path". Further, in another variant, the printer 10 may execute for example the authentication of the administrator password Pad (see T114 to T124 of FIG. 6) in the case where the printer 10 receives the access request from the terminal 500 via the communication path using the WFD connection (T412). In this variant, the communication path using the WFD connection is an example of the "second-type communication path".

(Variant 3) The printer 10 may be configured to be unable to receive the access request via the Internet 8. In this case, for example, the communication path within the single subnet and the communication path via the plurality of subnets are respectively an example of the "first-type communication path" and the "second-type communication path". In this example, the password authentication is an example of the "first authentication method" and the combination of the password authentication and the panel authentication is an example of the "second authentication method". In general terms, the "first-type communication path" may not be the communication path via the Internet.

(Variant 4) The printer 10 may execute only the authentication of the administrator password Pad without executing the authentication of the PIN code C in the case where the printer 10 receives the access request via the Internet 8. In general terms, the "first authentication method" may not include the "first user authentication".

(Variant 5) In the above embodiments, the authentication server 700 executed the authentication of the PIN code C (T50 of FIG. 4), however, the printer 10 may instead execute the authentication of the PIN code C. Specifically, when the PIN code C is generated by the authentication server 700 (T22), the printer 10 receives from the authentication server 700 and stores the PIN code C. Further, when the PIN code C is received from the terminal 100 (T42), the printer 10 may determine whether the received PIN code and the stored PIN code match without executing the process of T44. Further, in another variant, the printer 10 may generate the PIN code C and send the PIN code C to the terminal 600 using a phone line, for example. In general terms, the "second authentication information" may or may not be generated by the authentication server.

(Variant 6) The printer 10 may execute at least one of the authentication of the PIN code C, the authentication of the administrator password Pad, and the panel authentication in the case where the printer 10 receives the access request from the terminal 200 via the communication path within the single subnet SN1. In this variant, the "second authentication method" includes at least one of the "first user authentication", the "second user authentication", and the "third user authentication". In general terms, the "second authentication method" may not be limited to the second user authentication alone.

(Variant 7) The printer 10 may execute at least one of the authentication of the PIN code C, the authentication of the administrator password Pad, and the panel authentication in the case where the printer 10 receives the access request via the communication path via the plurality of subnets SN1, SN2. In this variant, the "second authentication method" includes at least one of the "first user authentication", the "second user authentication", and the "third user authentication". In general terms, the "second authentication method" may not include the second user authentication or the third user authentication.

(Variant 8) The printer 10 may not include the Wi-Fi I/F 20 or the USB I/F 22. In this variant, "receive a third request" may be omitted.

(Variant 9) The printer 10 may send the validated top screen data to the terminal without executing the user authentication in the case where the printer 10 receives the access request via the communication path in the single subnet. In this variant, the communication path in the single subnet is an example of the "third-type communication path". In general terms, the "third-type communication path" may be a communication path via any other device(s).

(Variant 10) The "wireless connection without intervention of any other devices" may be a wireless connection according to a so-called SoftAP, or may be a wireless connection according to an adhoc scheme.

(Variant 11) In the respective embodiments as above, the respective processes of FIGS. 3 to 9 are implemented by software (e.g., program 36), however, at least one of these processes may be implemented by hardware such as a logic circuit.

What is claimed is:

1. A communication device comprising:
 a memory configured to store a communication path and an authentication method in association with each other; and
 a controller configured to:
 receive a first request from a first terminal device via a first-type communication path;
 in a case where the first request is received from the first terminal device, execute user authentication using a first authentication method, the first authentication method being stored in the memory in association with the first-type communication path;
 receive a second request from a second terminal device via a second-type communication path different from the first-type communication path;
 in a case where the second request is received from the second terminal device before a change instruction for changing an authentication method is obtained by a user, execute the user authentication using a second authentication method different from the first authentication method, the second authentication method being stored in the memory in association with the second-type communication path,
 wherein in a case where the second request is received from the second terminal device after the change instruction for changing the authentication method has been obtained from the user, execute the user authentication using a third authentication method different from either the first authentication method or the second authentication method; and
 in a case where the user authentication is successful, execute a predetermined process.

2. The communication device as in claim 1, wherein the first-type communication path is a communication path via the Internet, and the second-type communication path is a communication path without intervention of the Internet.

3. The communication device as in claim 1, wherein the first authentication method is more secure than the second authentication method.

4. The communication device as in claim 1, wherein the memory is further configured to store first authentication information, wherein
 the first authentication method includes first user authentication in which second authentication information different from the first authentication information is used, the second authentication information being not stored in the communication device, and
 the second authentication method does not include the first user authentication and includes second user authentication in which the first authentication information is used.

5. The communication device as in claim 4, wherein the first authentication method includes both the first user authentication and the second user authentication.

6. The communication device as in claim 4, wherein the second authentication information is information generated by an authentication server different from the communication device.

7. The communication device as in claim 4, wherein the second authentication method only includes the second user authentication.

8. The communication device as in claim 1, wherein the second-type communication path is a communication path in a single subnet.

9. The communication device as in claim 4, wherein the second authentication method includes the second user authentication and third user authentication, and the third user authentication is for accepting a predetermined operation on the communication device.

10. The communication device as in claim 1, wherein the second-type communication path is a communication path via a plurality of subnets.

11. The communication device as in claim 1, wherein the controller is further configured to:
receive a third request from a third terminal device via a third-type communication path, wherein
in a case where the third request is received from the third terminal device, the user authentication is not executed.

12. The communication device as in claim 11, wherein the third-type communication path is a communication path without intervention of any other devices.

13. The communication device as in claim 12, wherein the third-type communication path is a communication path using a Universal Serial Bus (USB) cable.

14. The communication device as in claim 11, wherein
in a case where the third request is received from the third terminal device, the controller is configured to execute the predetermined process without executing the user authentication.

15. The communication device as in claim 12, wherein the third-type communication path is a communication path using a wireless connection without intervention of any other devices.

16. The communication device as in claim 11, wherein
in a case where the third request is received from the third terminal device, the controller is configured to execute a process different from the predetermined process without executing the user authentication.

17. A communication device, comprising:
a memory configured to store a communication path and an authentication method in association with each other; and
a controller configured to:
receive a first request from a first terminal device via a first-type communication path;
in a case where the first request is received from the first terminal device before a change instruction for changing an authentication method is obtained from a user, execute user authentication using a first authentication method, the first authentication method being stored in the memory in association with the first-type communication path, wherein in a case where the first request is received from the first terminal device after the change instruction for changing the authentication method has been obtained from the user, execute the user authentication using a third authentication method different from the first authentication method;
in a case where the user authentication is successful, execute a predetermined process; and
receive a third request from a third terminal device via a third-type communication path;
wherein in a case where the third request is received from the third terminal device, the user authentication is not executed, the not executing the user authentication being stored in the memory as the authentication method in association with the third communication path.

18. The communication device as in claim 17, wherein the third-type communication path is a communication path without intervention of any other devices.

19. The communication device as in claim 18, wherein the third-type communication path is a communication path using a Universal Serial Bus (USB) cable.

20. The communication device as in claim 17, wherein
in a case where the third request is received from the third terminal device, the controller is configured to execute the predetermined process without executing the user authentication.

21. The communication device as in claim 18, wherein the third-type communication path is a communication path using a wireless connection without intervention of any other devices.

22. The communication device as in claim 17, wherein
in a case where the third request is received from the third terminal device, the controller is configured to execute a process different from the predetermined process without executing the user authentication.

23. A non-transitory computer-readable recording medium storing computer-readable instructions for a communication device having a memory, the memory storing a communication path and an authentication method in association with each other,
the computer-readable instructions, when executed by a processor of the communication device, causing the communication device to:
receive a first request from a first terminal device via a first-type communication path;
in a case where the first request is received from the first terminal device, execute user authentication using a first authentication method, the first authentication method being stored in the memory in association with the first-type communication path;
receive a second request from a second terminal device via a second-type communication path different from the first-type communication path;
in a case where the second request is received from the second terminal device before a change instruction for changing an authentication method is obtained from a user, execute the user authentication using a second authentication method different from the first authentication method, the second authentication method being stored in the memory in association with the second-type communication path, wherein in a case where the second request is received from the second terminal device after the change instruction for changing the authentication method has been obtained from the user, execute the user authentication using a third authentication method different from either the first authentication method or the second authentication method; and in a case where the user authentication is successful, execute a predetermined process.

* * * * *